United States Patent

Nagy et al.

Patent Number: 5,528,887
Date of Patent: Jun. 25, 1996

[54] COMBINE ATTACHMENT FOR HARVESTING STEMMED GRAIN CROPS

[76] Inventors: Lajos Nagy, Fáy 5/1.B/II.15; György Lipusz, Ady 6.D/II/6; Sándor Püski, Mátyás k.19.; János Püski, Széchenyi t.1/I/4; Imre Takács, Fülöp u.8.; Imre Csarnai, Szarvasi 16 II/19; András Kohári, Veres P. A1/1, all of H-5630 Békés, Hungary

[21] Appl. No.: 347,083

[22] Filed: Nov. 23, 1994

[51] Int. Cl.⁶ .................................................. A01D 45/30
[52] U.S. Cl. ................................. 56/94; 56/214; 56/109
[58] Field of Search ............................... 56/94, 197, 199, 56/198, 214, 14.3, 119, 109, 73, 75, 82, 84, 88, 93, 54, 504

[56] References Cited

U.S. PATENT DOCUMENTS

| | | | |
|---|---|---|---|
| 2,867,961 | 1/1959 | Heilbrun | 56/119 |
| 3,462,922 | 8/1969 | Phillips et al. | 56/14.3 |
| 3,513,647 | 5/1970 | Johnston et al. | 56/219 |
| 3,736,734 | 6/1973 | Pavel | 56/119 |
| 4,204,385 | 5/1980 | Taylor | 56/119 |
| 4,538,404 | 9/1985 | Heimark, Jr. et al. | 56/119 |
| 4,633,657 | 1/1987 | Arnold | 56/119 |
| 5,195,309 | 3/1993 | Mossman | 56/119 |

*Primary Examiner*—Terry L. Melius
*Assistant Examiner*—Heather C. Shackelford
*Attorney, Agent, or Firm*—Spencer & Frank

[57] ABSTRACT

This invention relates to a harvesting machine (adapter) for gathering grain crops, mainly sunflower, comprising an underframe suspensible on the front part of a corn combine;

nose cones arranged on the front part of the underframe, projecting in the direction of travel, straddling from either side the rows of plants to be gathered and directing them into stem guiding channels;

cutting devices arranged at the rear part of the stem guiding channels and designed preferably as rotating cutting devices;

tray-like coverings arranged behind the frontal nose cones and in regions between the channels for collecting the dropped-out grains and directing them backward, said coverings being movably coupled to the underframe and their rearward slope being adjustable;

at least one picking-shaking or vibrating unit for picking, shaking or vibrating the tray-like coverings or at least the movably embedded part thereof to cause rearward movement of grains fallen onto them;

a transverse gathering device with a catch trough located on the underframe behind the tray-like coverings and the cutting devices, gathering cut-off crop from the entire working width onto a middle region of the catch trough and transferring said crop to a slanting conveyor of the combine.

16 Claims, 4 Drawing Sheets

COMBINE ATTACHMENT FOR HARVESTING STEMMED GRAIN CROPS

BACKGROUND OF THE INVENTION

1. Field of the Invention

This invention relates to a harvesting attachment (adapter), which—mounted to the front part of a known combine—serves for gathering grain crops, especially of such kinds, which readily drop out their seeds, such as sunflower.

2. Description of the Prior Art

As known, sunflower is one of our most important oil-yielding plants. In the case of ripe sunflower crops it can be observed, that in the course of harvesting sunflower grains tend to drop easily out of the sunflower disks. This dropping-out of grains, however, causes considerable harvesting losses. This loss is often further increased by the deficient capability of gathering lodged and entangled stems, as experienced with the known harvesting machines, whereby much of the crop remains ungathered in the field, and the harvesting loss becomes excessive.

From the Hungarian patent specification No. 178.941 a sunflower harvesting adapter is known, which is mounted to the front part of a conventional combine and which can be raised and lowered by means of hydraulic working cylinders of the combine. This sunflower harvesting adapter has an underframe provided at its front part with projecting finger-like nose cones by pairs straddling and directing the aligned sunflower stems. These nose cones guide said stems into channels arranged parallel with the direction of travel, where the stems are cut by a reaping mechanism so that they get into a catch trough. From here the cut-off crop is passed by charge pulleys into the central region of said trough, from where said cut-off crop is transferred by a slanting conveyor of the combine into the thrashing mechanism of said corn combine.

In the described arrangement the sunflower grains knocked out of the sunflower disks by the arising impacts are retained by tray-like coverings located on either side of said parallel channels. In normal working position of the harvesting adapter, these fixed tray-like coverings are inclined 25 to 35% backwards in the direction of the gathering worms and catch trough.

Practical experience has shown, however, that when gathering short-stem and/or lodged sunflower this harvesting adapter has to be operated as close as possible to the soil level, but to do so, the adapter must be tilted forward. But, by this forward tilting the backward slanting angle of the tray-like coverings considerably decreases or may even cease to exist, consequently the sunflower grains dropping out will not be able to slip back under the effect of gravitation into the direction of the catch tray of the gathering worms. Thus, the efficiency of harvesting will fail to attain the desirable level.

SUMMARY OF THE INVENTION

The aim set by the present invention has been to eliminate the above deficiencies, i.e. to create an improved harvesting adapter, by which the grains dropping out in the adapter can reliably be caught and safely forwarded into the catch trough of the gathering device.

A further aim of the present invention has been to provide an arrangement by which even low-grown or lodged plants can safely be brought into upright position and guided into the harvesting adapter, thereby improving further the efficiency of gathering.

The present invention based on the recognition that the forwarding of dropped-out grains to the crop gathering mechanism can be accomplished satisfactorily by reducing friction by Shaking or vibrating the grain-catching tray-like coverings. As a further recognition, the safe lifting and guidance of low-grown or lodged crop into the adapter can be accomplished by making the front nose cones vertically adjustable, adding an active stem-deflecting device to the stem-guiding channels located between the coverings.

Thus, according to the present invention, the aim set has been achieved by a harvesting machine (adapter), comprising an underframe adjustably attached to, and suspended on, the front side of a corn combine, said underframe having, at its rear part a gathering device located in a catch trough arranged perpendicularly to the direction of travel of said combine. The gathering device comprises two conveying worms provided with opposed-pitch sections conveying the cut-off crop toward the centre from where the crop is forwarded, in a known manner, by a slanting conveyor of the combine. On the front part of the underframe nose cones are provided for straddling the rows of plant from either side and guiding them into the stem channels that can be adjusted vertically with respect to the underframe according to the present invention.

These stem-receptive channels are arranged parallel to the direction of travel. Between said stem-receptive channels, as well as between the front nose cones and rear catch trough, there are tray-like coverings mounted on the underframe with the purpose of gathering the dropped out grains. The backward slanting of these coverings is adjustable. On the other hand these tray-like coverings are—at least partly—movable, preferably resiliently suspended and coupled to a picking-shaking or vibrating unit. This picking-shaking effect may be performed e.g. by an eccentric-lever mechanism.

According to a further feature of the invention all the channels may expediently be equipped with an active stem-deflecting device such as a chain drive arranged parallel to the channel, and provided with transverse driving pins projecting into said channel. The plant stems, leaning against the stem-deflecting device, are safely guided to a rotary cutting device, where, after being pressed against a fixed blade, are safely cut. This stem-deflecting device is termed "active" stem deflector, since it is provided with a separate driving unit.

BRIEF DESCRIPTION OF THE DRAWINGS

In the following the invention is described in detail with reference to the attached drawing, presenting two preferred embodiments complying with the invention.

In the drawings.

DESCRIPTION OF THE PREFERRED EMBODIMENTS

Figure 1:
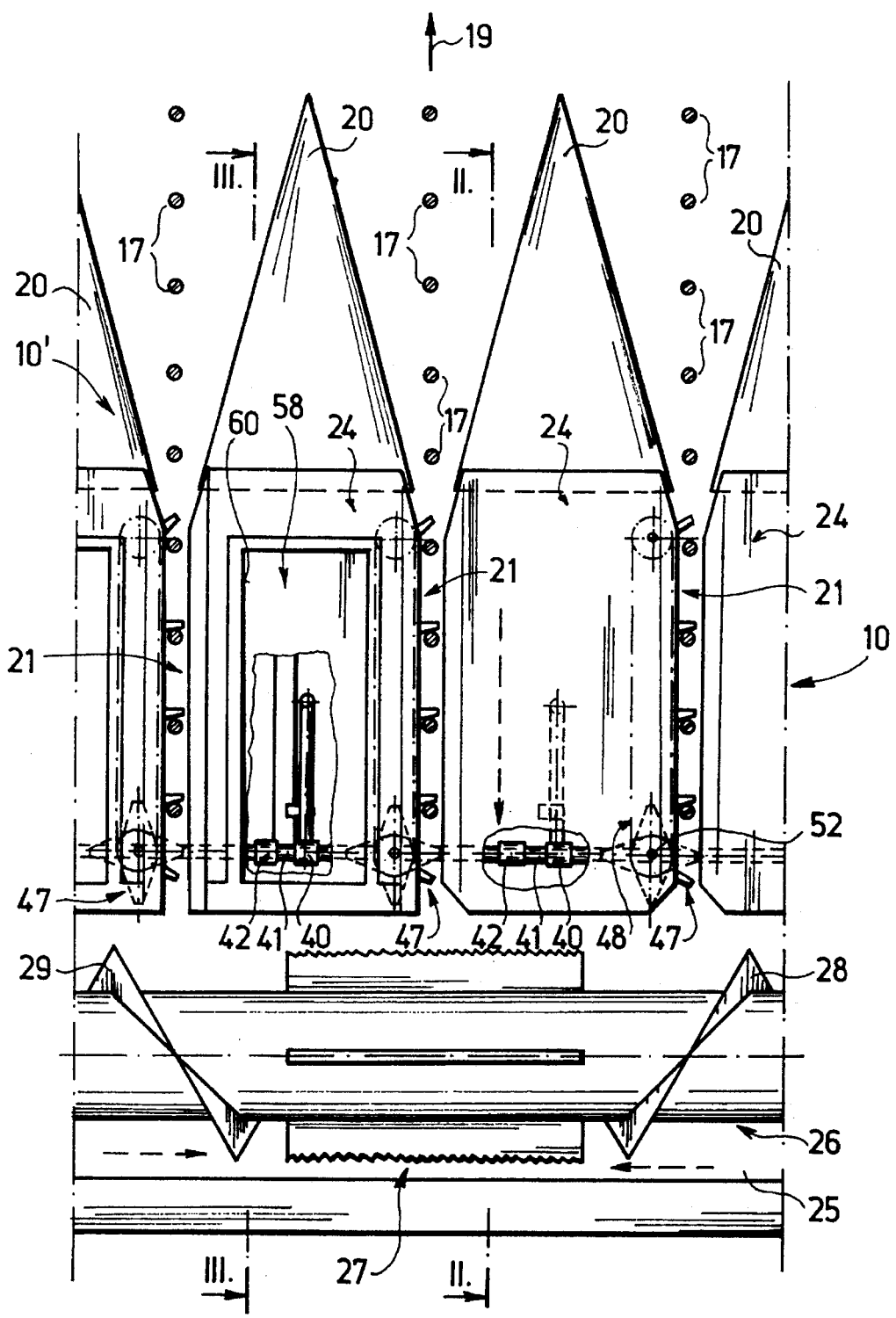
FIG. 1 is a simplified top view of two variants of a detail of a harvesting adapter according to the invention.

As shown in the drawings, a harvesting adapter according to the invention serves for gathering sunflower. It should be noted, however, that in the top view shown in FIG. 1, only the middle part of a harvesting adapter 10 is presented. Furthermore, in FIG. 1 two embodiments are illustrated, namely on the right-hand side of FIG. 1 the first embodiment, and on the left-hand side of FIG. 1 the other one.

Figure 2:
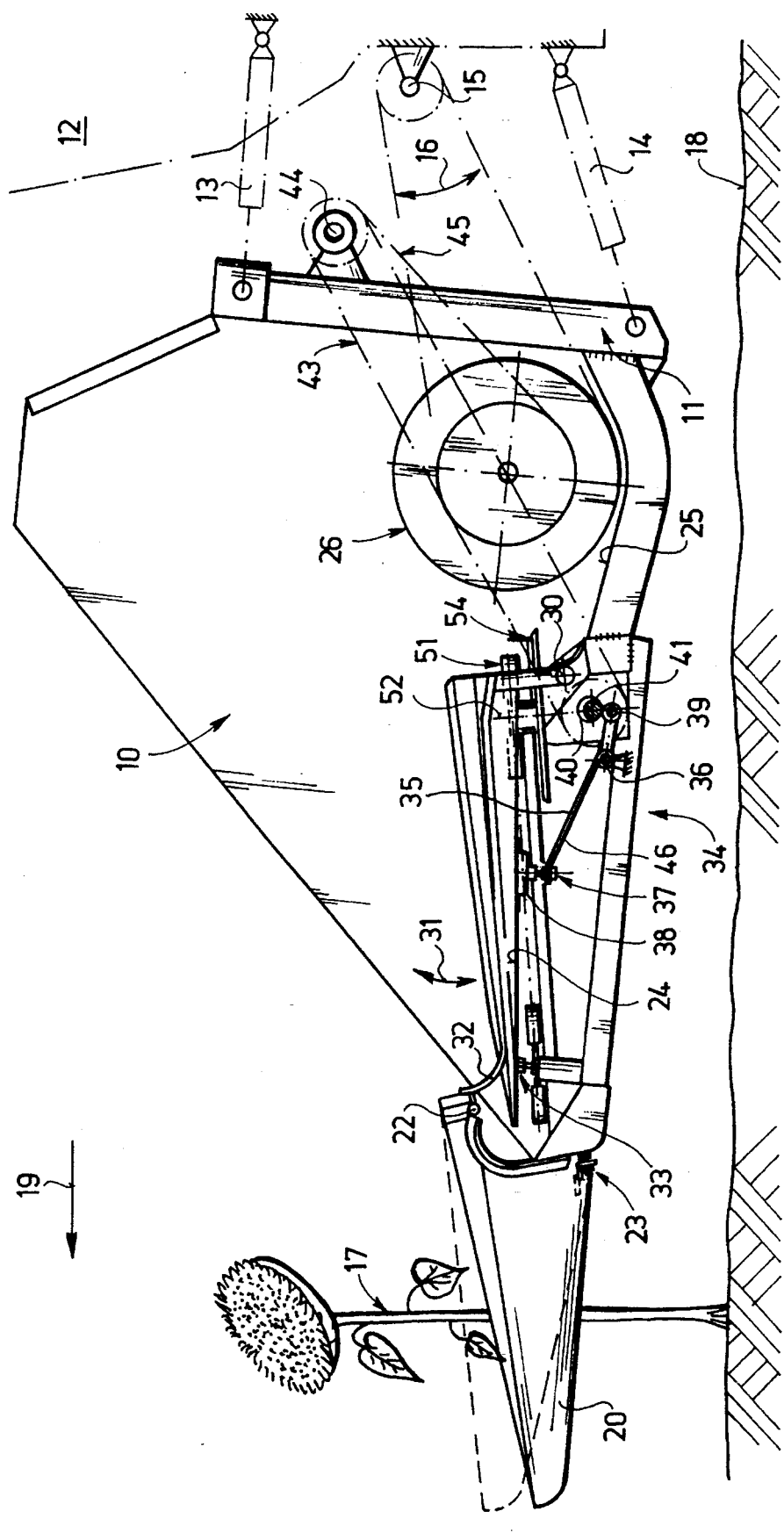
FIG. 2 is a section taken along line II—II of one variant shown in FIG. 1.

The sunflower harvesting adapter 10 shown in FIG. 1 and 2 comprises an underframe 11 by means of which said adapter 10 can be suspended in a vertically adjustable way on the front part of a corn combine 12, in a way known in itself. The corn combine 12 and its suspending hydraulic working cylinders 13 and 14 are indicated by thin dash-and-dot lines in FIG. 2. Thus, in the front part of the corn combine 12 the harvesting adapter 10 can be raised or lowered around a pivot 15 in the direction of an arrow 16.

The first embodiment of the harvesting adapter 10 shown in FIG. 1 and 2, suspended to the corn combine 12 is suitable for a single-run gathering of sunflower crops. In FIG. 2 only one sunflower 17 is shown and a soil level is marked with reference number 18.

As illustrated in FIG. 1 and 2, the underframe 11 is provided with nose cones 20 projecting toward the front—when looking in the direction of travel indicated by an arrow 19—. Said nose cones 20 straddle the rows of sunflowers 17 from both sides, as shown in FIG. 1. These nose cones 20 serve for straddling the sunflowers 17 guiding or driving them into channels 21 arranged parallel to the arrow 19.

In FIG. 2 it can be seen that, according to the invention, the nose cone 20 is adjustable in vertical direction, with respect to the underframe 11. Therefore said nose cone 20 is connected to the underframe 11 through a pivot 22, around which it can be displaced up and down (its higher position marked by thin broken lines) by means of an adjusting unit 23. In this embodiment said adjusting unit 23 is designed as a screw-operated adjusting member. With the adjusting units 23 the nose cones 20 can be adjusted also downwards to a desired extent with respect to the soil level 18, which is especially advantageous when harvesting a sunflower field where the sunflower stems are short or lodged.

Behind the nose cones 20 and between each two channels 21 tray-like coverings 24 are provided on the underframe 11 which are usually arranged slanting backwards. These tray-like coverings 24 serve for retaining sunflower grains dropping out from sunflower disks getting into the harvesting adapter 10 and to guide these grains backwards into a transverse catch trough 25. Said transverse catch trough 25 constitutes part of a transverse gathering device 26 known in itself, having the task of forwarding the gathered crop into a middle region 27 of the catch trough 25 (FIG. 1). The transverse gathering device 26 is provided with conveyor worms 28 and 29 having opposed-pitch worm sections and a common drive (to be dealt with further below).

Thus, the tray-like coverings 24 slant rearward, toward the catch trough 25. The angle of this slant was selected only about 3 to 5° during our experiments. According to the invention, the tray-like coverings 24 are coupled to the underframe 11, fully or partly, through a resilient seating or suspension, and its rearward slant with respect to the horizontal plane (and with respect to the underframe 11) is adjustable. With the first embodiment presented as example (right-hand part of FIG. 1 and in FIG. 2) the tray-like covering 24 is made of a single sheet, so that the side edges are bent up to form beads. This covering 24 is connected to the underframe 11 through a joint 30 tiltable up and down as indicated by an arrow 31, whereas its front part is suspended on the underframe 11 through a resilient member 32, which can be made e.g. of a rubber strap. One end of the strap-like resilient member 32 is secured to a front part of the underframe 11, while another end thereof is attached to a front part of the covering 24 (FIG. 2).

The rearward slant of the covering 24 can be adjusted according to the invention by means of an adjusting unit 33. According to FIG. 2, the adjusting unit 33 is formed as a threaded setting member arranged under the front part of the covering 24, by means of which the rearward slant of covering 24 can be adjusted.

According to the invention, the coverings 24 are provided with at least one picking-shaking or vibrating unit 34, which shakes, picks or vibrates at least the bottom plate of the coverings 24 to cause efficient rearward displacement of the grains. In the illustrated embodiments the picking-shaking unit 34 is formed as a mechanism comprising a two-armed lever 35. Said two-armed lever 35 is tiltably attached to the underframe 11 through a joint 36. In this case, one end of the two-armed lever 35 is connected to a stand 38 attached to the bottom part of the covering 24 through an adjusting unit 37. To the other free end of the two-armed lever 35 a roller 39 is fitted that cooperates with an eccentric disk 40 (FIG. 2). The eccentric disks 40 of all picking-shaking units 34 are mounted releasably and in axially displaceable way on a common transverse shaft 41.

As clearly shown in FIG. 1, under the covering 24 a second eccentric disk 42 is accommodated beside the first eccentric disk 40 on the shaft 41, having an eccentricity exceeding that of the eccentric disk 40. The eccentric disks 40 and 42 are interchangeable. Since the eccentric disks 40 and 42 are displaceably mounted on the shaft 41, one or the other can be brought into linked-up position with the roller 39, depending on the desired amplitude of shaking.

In FIG. 2 it is only schematically indicated that the shaft 41 obtains its torque, in this case, through a chain drive 43 from a countershaft 44 driven in turn through a universal joint shaft from a slanting conveyor of the corn combine 12 (not shown). From the countershaft 44 through another chain drive 45 also the transverse gathering device 26 is driven, as being schematically indicated in FIG. 2.

According to FIG. 2 an arm 46 of the two-armed lever 35 coupled to an adjusting unit 37, is made from spring-steel plate by which the efficiency of the shaking-picking action can be improved further.

When the common shaft 41 is rotated, through the eccentric disk 40 and two-armed lever 35, the covering 24 is subjected to picking and shaking of an intensity depending on the adjustment. Since in the first embodiment the tray-like covering 24 is fixed to the underframe 11 through the joint 30, the amplitudes of the shaking/picking action are the largest at the front part of the covering 24 and become gradually smaller while passing backwards.

Figure 4:
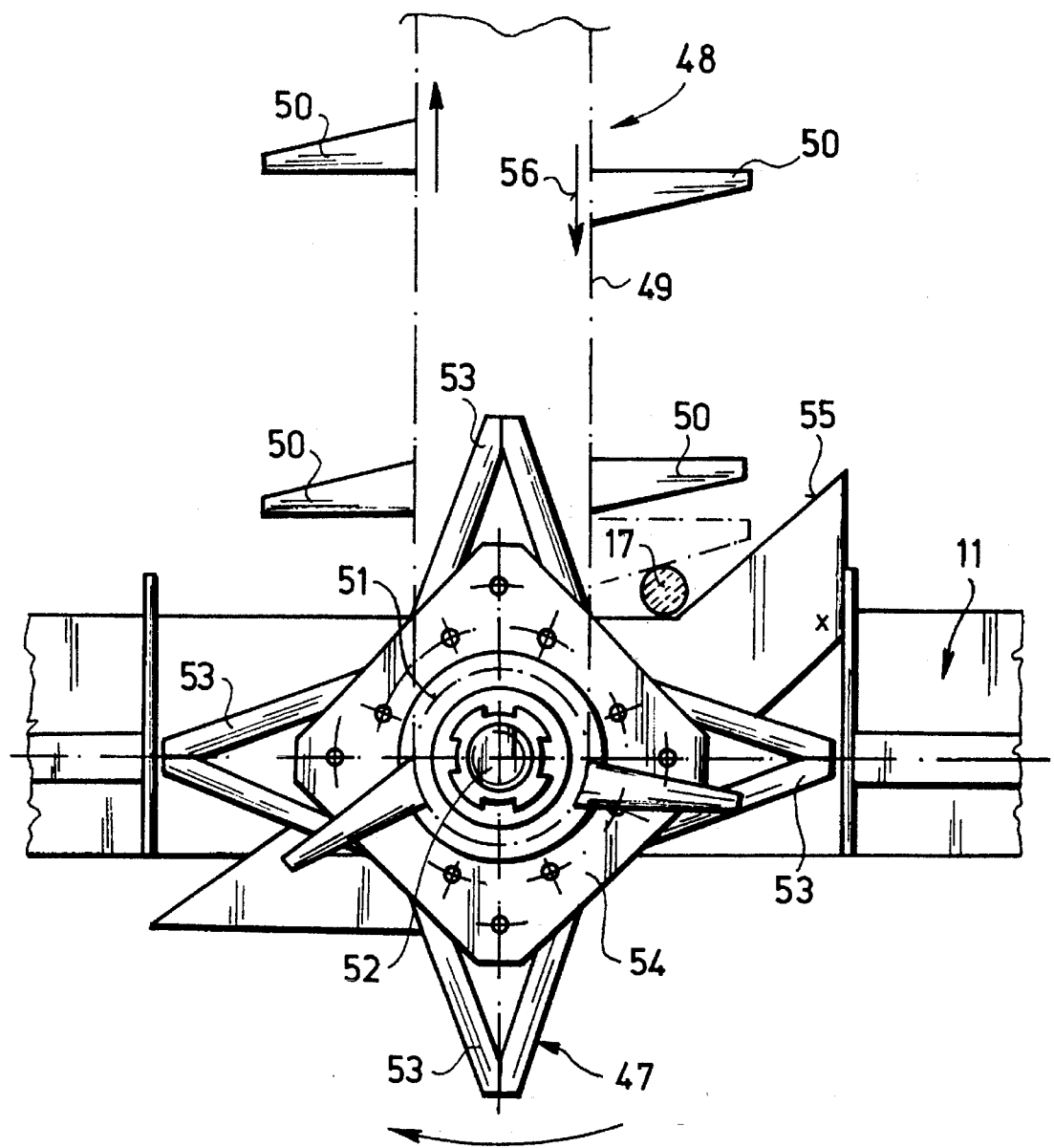
FIG. 4 is a detail of the arrangement of FIG. 1, showing the top view of the rotating cutting device and the stem deflecting device in a relatively larger scale.

In FIG. 1 and 2 it can be seen that in the region of the rear part of the channels 21 cutting devices 47 are provided that are designed as rotary cutting devices in the present case. In FIG. 1 is further clearly shown that each channel 21 is equipped with an active stem-deflecting device 48 according to the invention, serving for guiding the plant stems in the channel 21 and driving them rearward at a prespecified speed. In the present case, the active stem-deflecting device 48 is designed as a chain drive located under the covering 24 and arranged parallel with the channels 21, comprising a driven chain 49 from which forwarding fingers 50 protrude into the channel 21 (FIG. 4). A lower sprocket 51 of the active stem-deflecting device 48 is fixed on a shaft 52 slightly leaning forward with respect to the vertical direction (FIG. 1, 2 and 4), said shaft 52 being driven from the shaft 41 through a bevel gear pair in a known way (not shown).

The cutting device 47 comprises a rotor 54 being also fixed to said shaft 52. Said rotor 54 is located under the lower sprocket 51 of the stem-deflecting device 48, and is provided with knives 53. The rotary knives 53 of the rotor 54 act together with a counter-blade 55 fixed to the underframe 11, as clearly shown in FIG. 4. The forwarding finger 50 of the active stem-deflecting device 48 carries stems of the sunflowers 17 in the direction of arrow 56 in FIG. 4, they abutt on an obtuse-angled cutting edge of the counter-blade 55. At that instant the abutting sunflower stem is safely severed by one of the cutting knives 53 of the rotor 54.

Figure 3:
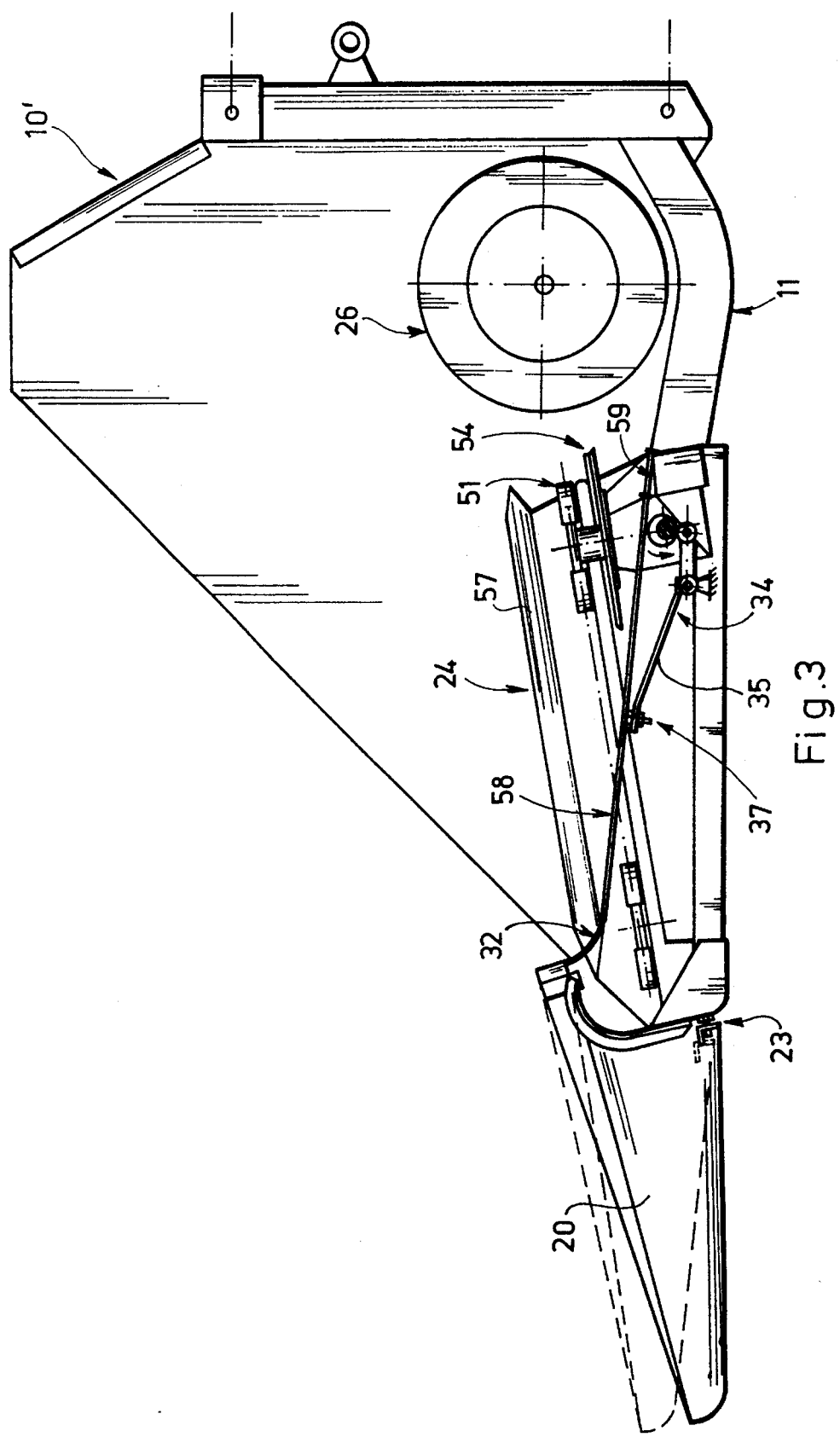
FIG. 3 is a section taken along line III—III of the other embodiment shown in FIG. 1.

On the left-hand side of FIG. 1 and FIG. 3 another embodiment of the invention shown as an example is marked with reference number 10'. This embodiment is essentially equal to that presented as first example, therefore identical parts have been designated by the same reference numbers. The only difference of the second embodiment lies in the design of the tray-like covering 24, which—instead of being a single sheet—consists of two parts, namely of a frame section 57 provided with bent-up sides and with a bottom plate 58 as shown in FIG. 1.

The frame section 57 may be made of steel sheet as well, it is however rigidly fixed to the underframe 11 (FIG. 3), on the other hand, the bottom plate 58 is—according to the invention—adjustably and resiliently suspended on the underframe 11. In the present case, said bottom plate 58 is attached with its front part to the underframe 11 through a resilient member 32, that can be e.g. a rubber strap. Further, the bottom plate 58 is coupled, with its rear part, to the underframe 11 through another resilient member 59, that can also be e.g. a rubber strap.

On the left side of FIG. 1 it is indicated schematically that the resiliently suspended bottom plate 58 is received by a rectangular opening 60 of the fix frame section 57. Sealing-off the gap between the opening 60 and lateral edges of the bottom plate 58 has to be attended to separately. This can be done by using known matching gaps or by installing suitable flexible wrapping elements (not shown).

In the second embodiment shown in FIG. 3, the rearward inclination of bottom plate 58 can be adjusted e.g. by properly selecting the length of resilient member 32 or 59, or by means of the threaded adjusting unit 37 transferring the picking action of the picking-shaking unit 34 to the bottom plate 58. In other respects the variant shown in FIG. 3 is identical with the embodiment of FIG. 1 and 2, so that it should be clear for a person having ordinary skill in the art.

When harvesting is commenced, the height of the nose cones 20 is adjusted according to the height and lodging of sunflowers 17 by means of the adjusting units 23. Height adjustment of the harvesting adapter 10 has already been performed earlier by raising or lowering the adapter 10 by the hydraulic working cylinders 13, 14 of the corn combine 12. By rotating the countershaft 44, the gathering device 26, the shaft 41 through the chain drive 45 and 43, respectively, as well as the common driving shaft 52 of the cutting devices 47 and of the active stem-deflecting devices 48 are also driven.

Thereupon, while the combine 12 with the harvesting machine 10 or 10' is moving forward in the direction of the arrow 19, the stems of the sunflowers 17 are directed by the nose cones 20 into the channels 21, where their forwarding and guidance is supported by the active stem-deflecting devices 48. It is to be noted here that, as shown by experience, it is expedient to select the backward transporting speed of the active stem-deflecting devices 48 to exceed the travelling speed of the harvesting combine 12 by e.g. 10%, whereby the efficiency of stem deflection and stem guidance within the channels 21 can be further improved.

At the rear end of the channels 21 the stems of the sunflowers 17 are severed by the cutting devices 47, and the cut-off crop is transferred by the conveying worms 28 and 29 of the gathering device 26 into the middle region 27 of the catch trough 25. From here the cut-off sunflowers are fed in the known way by the slanting conveyor (not shown) into a thrashing machine of the combine 12.

The dropping-out sunflower grains guided in the harvesting adapter 10 or 10' fall onto the tray-like coverings 24, and from here, owing to the picking-shaking units 34, said grains safely slip rearward, even at a relatively slight backward slope (moreover, even in horizontal position of the bottom plate) into the catch trough 25. If required, the amplitude of the picking-shaking action can be increased by operating the other eccenter disks 42 having increased eccentricity. Of course, the frequency of picking can be increased or decreased by varying the r.p.m of the shaft 41.

The active stem-deflecting devices 48 and the adjustable nose cones 40 effectively facilitate lifting of lodged sunflower stems and proper guidance thereof, whereby the efficiency of harvesting can considerably be improved as compared to conventional adapters. Through setting lodged plants upright and maintaining them in proper position within the adapter the effectiveness of the cutting devices 47 has been improved.

This, with the use of picking-shaking units 14 the entire covering 24 or only its bottom plate 58 is subject to continuous picking and shaking that is transferred to the grains effectively reducing their friction resistance on the coverings 24.

It is pointed out that, although as picking-shaking unit 34 an eccentric-lever mechanism has been described, in a give case an e.g. electrically driven vibrator e.g. for adjustable frequency may just as well be used as unit 34.

The frequency of picking, shaking or vibration may be selected and adjusted in advance depending on actual harvesting conditions (e.g. humidity content, degree of ripeness, etc.).

The harvesting adapter 10 resp. 10' according to the invention may by applied, in addition to sunflower, for harvesting other cereals, such as maize, broomcorn, etc. with the same advantages.

We claim:

1. A harvesting attachment for a combine for gathering stemmed grain crops, comprising an underframe suspensible on a front part of the combine;

nose cones arranged on a front part of the underframe, said nose cones projecting in a direction of combine travel, straddling from either side of the rows of plants to be gathered and directing them into stem guiding channels;

cutting devices arranged at a rear part of the stem guiding channels;

tray-like coverings arranged behind the nose cones and in regions between the channels for collecting the dropped-out grains and directing them backward, said tray-like coverings being coupled by resilient members to the underframe, said coverings having an adjustable, rearwardly extending slope;

at least one picking-shaking or vibrating unit for picking, shaking or vibrating the tray-like coverings to cause rearward movement of grains fallen thereonto;

a transverse gathering device including a catch trough located on the underframe behind the tray-like coverings and the cutting devices, said transverse gathering device being operatively connected with a conveyor of the combine; and an active stem-deflecting device for guiding and forwarding the plant stems within the stem guiding channels before and during severance thereof by said cutting devices.

2. A harvesting machine (adapter) as claimed in claim 1, wherein a height level of the nose cones is adjustable.

3. A harvesting machine as claimed in claim 1, wherein each tray-like covering is made of a single rigid sheet.

4. A harvesting attachment as claimed in claim 1, wherein the tray-like coverings are connected with an adjusting unit for adjusting the rearward slope of said coverings.

5. A harvesting attachment as claimed in claim 1, wherein the tray-like coverings are connected with an adjusting unit for adjustment of the slope of said coverings; and said adjusting unit is arranged at a junction trestle between a lower part of said coverings and the picking-shaking unit.

6. A harvesting attachment as claimed in claim 1, wherein the picking-shaking unit comprises an eccentric-lever mechanism.

7. A harvesting attachment as claimed in claim 6, wherein said eccentric-lever mechanism includes a driven shaft carrying an eccentric disk; said eccentric disk cooperating with a roller rotatably arranged on a first end of a two-armed lever being mounted on the underframe by a joint; said two-armed lever having a second end connected to a lower part of a respective said covering.

8. A harvesting attachment as claimed in claim 1, comprising means for adjusting a stem-forwarding speed of said active stem-deflecting device.

9. A harvesting attachment as claimed in claim 1, further comprising a joint pivotally attaching a rear part of each said tray-like covering to said underframe.

10. A harvesting attachment for a combine for gathering stemmed grain crops, comprising an underframe suspensible on a front part of the combine;

nose cones arranged on a front part of the underframe, said nose cones projecting in a direction of combine travel, straddling from either side of the rows of plants to be gathered and directing them into stem guiding channels;

cutting devices arranged at a rear part of the stem guiding channels;

tray-like coverings arranged behind the nose cones and in regions between the channels for collecting the dropped-out grains and directing them backward; each said covering includes a frame part fixed to the underframe and a bottom plate movably arranged in an opening of said frame part, said bottom plate being suspended on the underframe by resilient members; said bottom plates having an adjustable rearward slope;

at least one picking-shaking or vibrating unit for picking, shaking or vibrating the bottom plates of said coverings to cause rearward movement of grains fallen onto said coverings;

a transverse gathering device including a catch trough located on the underframe behind the tray-like coverings and the cutting devices, said transverse gathering device being operatively connected with a conveyor of the combine; and an active stem-deflecting device for guiding and forwarding the plant stems within the stem guiding channels before and during severance thereof by said cutting devices.

11. A harvesting attachment as claimed in claim 10, wherein the picking-shaking unit comprises an eccentric-lever mechanism.

12. A harvesting attachment as claimed in claim 11, wherein said eccentric-lever mechanism includes a driven shaft carrying an eccentric disk; said eccentric disk cooperating with a roller rotatably arranged on a first end of a two-armed lever being mounted on the underframe by a joint; said two-armed lever having a second end connected to a lower part of a respective said covering.

13. A harvesting attachment as claimed in claim 10, comprising means for adjusting a stem-forwarding speed of said active stem-deflecting device.

14. A harvesting attachment for a combine for gathering stemmed grain crops, comprising an underframe suspensible on a front part of the combine;

nose cones arranged on a front part of the underframe, said nose cones projecting in a direction of combine travel, straddling from either side of the rows of plants to be gathered and directing them into stem guiding channels;

cutting devices arranged at a rear part of the stem guiding channels;

tray-like coverings arranged behind the nose cones and in regions between the channels for collecting the dropped-out grains and directing them backward, said coverings being movably coupled to the underframe; said coverings having an adjustable, rearwardly extending downward slope; each said covering includes a frame part attached to the underframe and a bottom plate movably arranged in an opening of said frame part, said bottom plate being movably suspended by resilient members;

at least one picking-shaking or vibrating unit for picking, shaking or vibrating said bottom plates to cause rearward movement of grains fallen thereonto; and a transverse gathering device including a catch trough located on the underframe behind the tray-like coverings and the cutting devices for gathering cut-off crop from an entire working width onto a middle region of the catch trough and for transferring said crop to the combine.

15. A harvesting attachment for a combine for gathering stemmed grain crops, comprising an underframe suspensible on a front part of the combine;

nose cones arranged on a front part of the underframe, said nose cones projecting in a direction of combine travel, straddling from either side the rows of plants to be gathered and directing them into stem guiding channels;

cutting devices arranged at a rear part of the stem guiding channels;

tray-like coverings arranged behind the nose cones and in regions between the channels for collecting the dropped-out grains and directing them backward, said coverings being movably coupled to the underframe by resilient members, said coverings having an adjustable, rearwardly and downwardly extending slope;

at least one picking-shaking or vibrating unit for picking, shaking or vibrating the tray-like coverings to cause rearward movement of grains fallen thereonto; said picking-shaking unit comprising an eccentric-lever mechanism; and a transverse gathering device including a catch trough located on the underframe behind the tray-like coverings and the cutting devices for gathering cut-off crop from an entire working width onto a middle region of the catch trough and for transferring said crop to the combine.

16. A harvesting attachment as claimed in claim 15, wherein said eccentric-lever mechanism includes a driven shaft carrying an eccentric disk said eccentric disk cooperating with a roller rotatably arranged on a first end of a two-armed lever being mounted on the underframe by a joint; said two-armed lever having a second end connected to a lower part of a respective said covering.

* * * * *